Oct. 23, 1956  B. JONES  2,768,365
TRAFFIC CONTROL SYSTEM
Filed July 28, 1952  2 Sheets-Sheet 1

INVENTOR:
Bayard Jones

Oct. 23, 1956
B. JONES
2,768,365
TRAFFIC CONTROL SYSTEM
Filed July 28, 1952
2 Sheets—Sheet 2
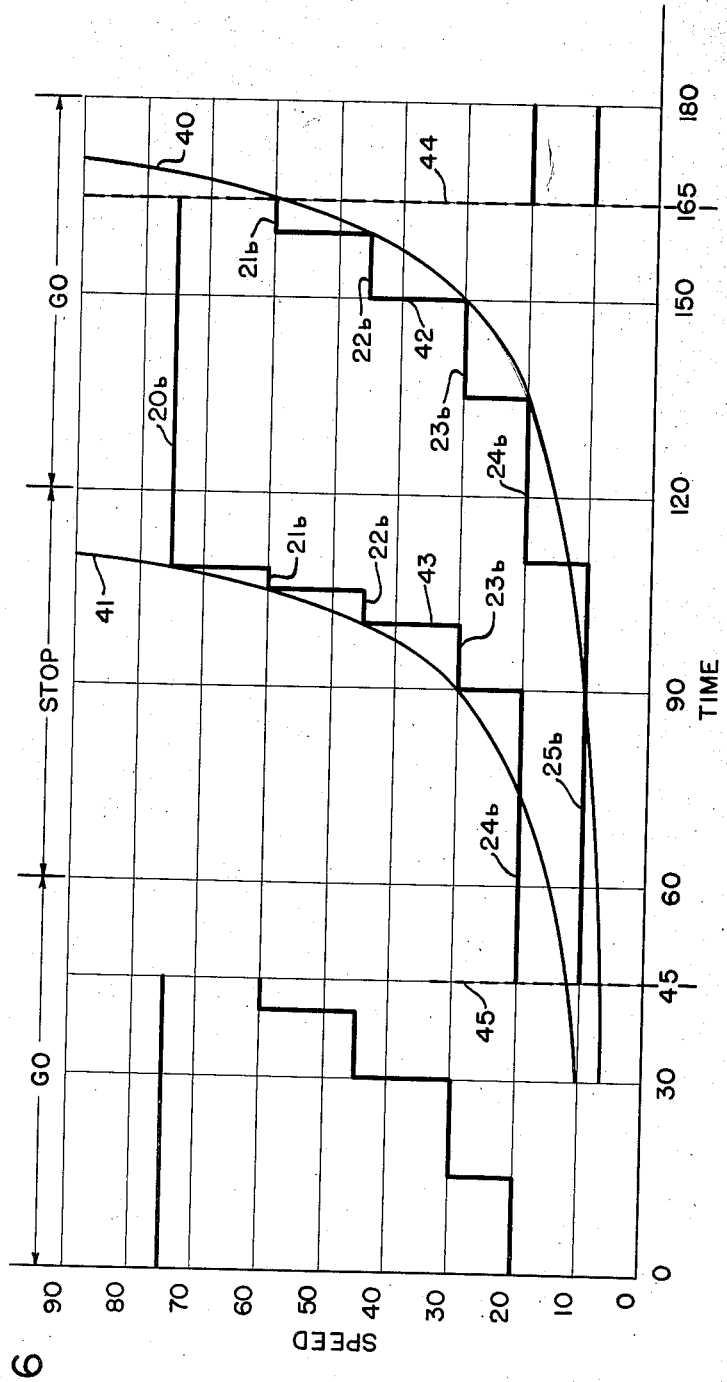
FIG. 6
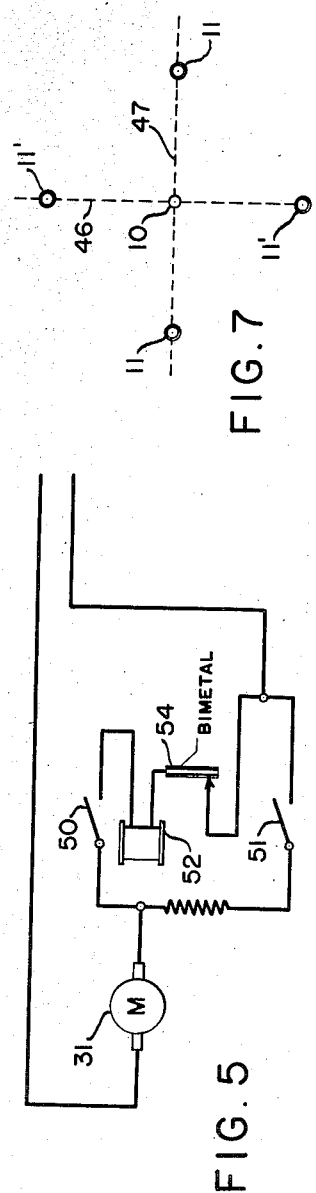
FIG. 7
FIG. 5
INVENTOR:
Bayard Jones

United States Patent Office 2,768,365
Patented Oct. 23, 1956

2,768,365

TRAFFIC CONTROL SYSTEM

Bayard Jones, Glencoe, Ill.

Application July 28, 1952, Serial No. 301,259

6 Claims. (Cl. 340—43)

This invention relates to an improved method of and means for traffic control.

Heretofore the usual method of controlling the flow of traffic past a given point such as an intersection has been to provide a stop and go signal at that point. This method is reasonably satisfactory for pedestrians and for vehicular traffic that is moving so slowly that the vehicle can come to a practically instantaneous stop. However, for vehicles moving at a moderate speed, the reaction time of the vehicle operator plus the deceleration time renders some type of warning signal desirable to apprise the operator of an impending change, such as the well known "amber" light.

The usual amber light type of warning is totally inadequate for high speed traffic, such as is found on through highways; at the time the amber light is initially energized, the vehicle, or car, may be traveling too fast to come to a safe stop prior to the illumination of the red light with the result that the car passes the intersection on a red light, or the operator jams on the brakes causing undue strain on the car and possible injury to its occupants. To avoid this, the careful operator will drive at a speed which is less than that for which the highway is designed thereby increasing traffic congestion.

The same problem presents itself to a somewhat lesser degree on highways and streets designed for traffic of more moderate speed, especially when it is considered that there is no standardization of the stop and go intervals, nor of the duration of the amber light or other warning indications.

It is an object of this invention to provide an improved method and means for traffic control which avoids the above-mentioned objections, and, in particular, which gives an indication or warning of an impending light change in terms of car speed.

A further object is to provide a method and means of enabling an operator to regulate the operation of his car in accordance with an indication given in terms of an objective and readily ascertainable standard, as contrasted to the subjective evaluation of an elapsed time interval which is required with certain types of warning indications, such as an amber light.

Another object is to provide a method and means for providing a car operator with information relative to an impending light change when he is at a substantial distance from the stop and go signal so that the decision of whether the car speed should be reduced or maintained can be made at a convenient time.

According to the present invention I provide, in addition to the usual stop and go signal, a second signal which is spaced therefrom and which indicates, in advance of a change from green to red, the average car speed which must be maintained or exceeded in order to "make" the green light.

A further object is to provide such a speed indicating signal in the form of a series of lights together with means for sequentially energizing the same in such a manner as to provide the above information.

Still another object is to provide a speed indicating signal which identifies a varying speed range, the operation of which is synchronized with the stop and go signal, to the end that the traffic flow may be gradually shifted from a continuous flow to an intermittent or bunched flow prior to the time that the individual cars arrive at the stop and go signal, thereby avoiding stopping at the intersection, and the congestion resulting herefrom.

According to this aspect of my invention, the primary traffic control device is the speed indicating signal since, if it is obeyed, the movement of each car will be continuous, without any interruption due to the stop and go signal. Thus, in a typical cross roads installation embodying four speed indicating signals, the bunched flow along one highway will intermesh with the bunched flow along the other highway in a manner which creates no interference between the two streams of traffic.

A further object is to provide a speed indicating signal having a single series of speed indicia which are arranged and actuated in such a manner that the single series serve to indicate both minimum and maximum speeds.

A still further object is to provide an improved traffic control system which indicates, in terms of desired speed, not only an indication of an impending change from green to red, but also of an impending change from red to green.

With reference now to the drawings in which like reference numerals designate like parts:

Fig. 5 is a wiring diagram showing a single cycle type of control for the drum;

Fig. 6 is a graph showing the sequence in which the speed indicator lights are operated, and Fig. 7 is a diagram showing the relative positions of the signals as installed.

Figure 1:
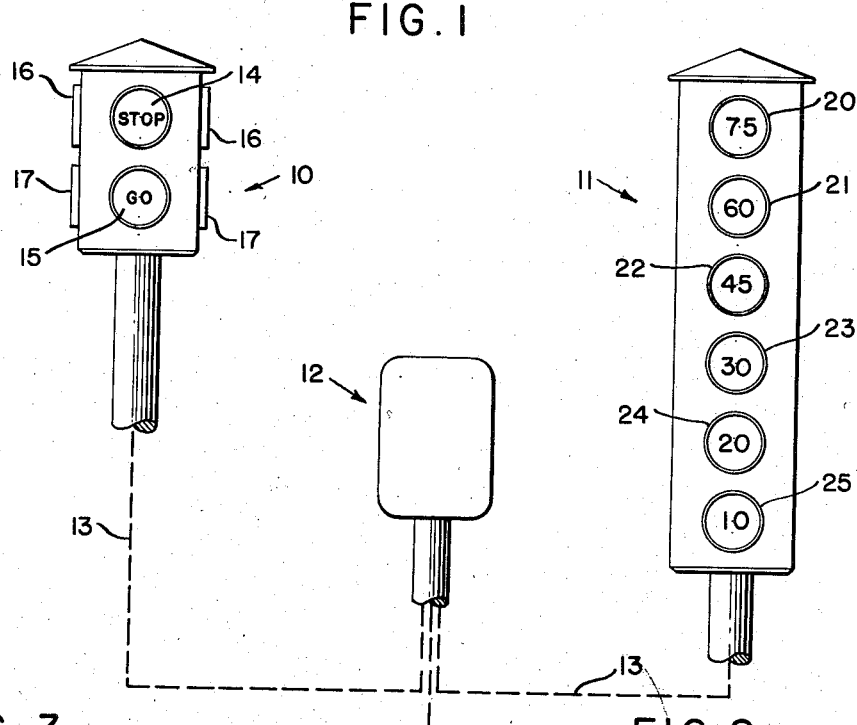
Fig. 1 is an elevation showing a preferred embodiment of my invention.

The present invention contemplates provision of a standard type of stop and go signal, indicated generally in Fig. 1 by the reference numeral 10 in combination with a speed indicating signal 11. The two signals may be spaced from each other on a street or highway by a substantial distance, such as a quarter of a mile. A control box 12 may be located at any convenient point; the signals 10 and 11 and the control box are connected to each other by cables 13.

The stop and go signal 10 includes a stop light 14 and a go light 15 which are enclosed in a suitable housing. As is customary, the signal 10 also includes stop light 16 and go lights 17 arranged for cross traffic, which are operated out of phase with the stop and go lights 14 and 15 respectively. The rear surface of the signal may also be provided with lights corresponding to lights 14 and 15.

The speed indicating signal 11 comprises a housing in which are located a series of speed indicating lights 20–25 which are adapted to be sequentially operated in a manner pointed out hereinafter.

Figure 2:
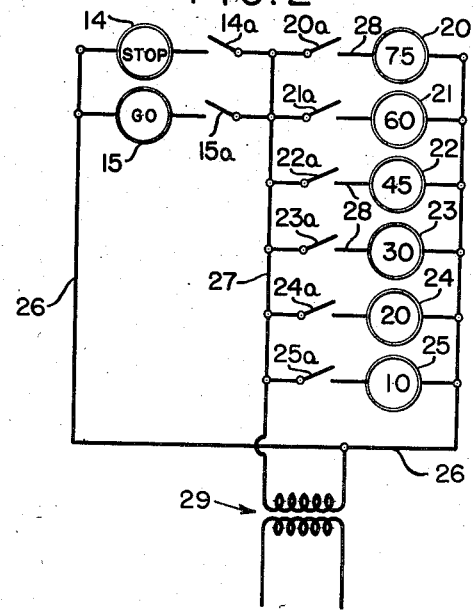
Fig. 2 is a wiring diagram.

The various lights are energized as indicated in Fig. 2; each light is connected at one side to a common conductor 26, and at the other side, by means of individual conductors 28 to a common conductor 27. The individual conductors 28 together with the common conductor 26, make up the cable 13 which extends from the respective signals 10 and 11 to the control box 12 in which the various switches *a* are located.

Between each individual conductor 28 and the common conductor 27 is interposed a switch, referred to generally by the reference numeral $a$, and designated specifically by the reference numerals 20$a$ to 25$a$, and by 14$a$ and 15$a$. Thus, each one of the lights 14, 15 and 20 to 25 can be energized by its corresponding switch as shown in Fig. 2.

The conductors 26 and 27 can be energized by a suitable power source such as the transformer 29 which can be connected into the usual commercial power system.

Figure 3:
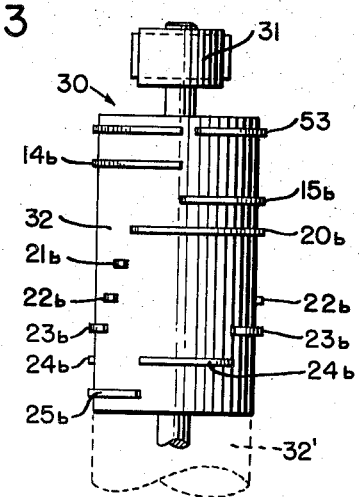
Fig. 3 is a diagrammatic representation of the control means for actuating the switches.
Figure 4:
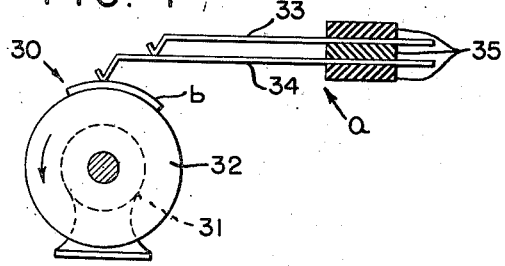
Fig. 4 is an end view of the control means shown in Fig. 3 and illustrating the cooperation between the drum and one of the switches.

The switches $a$ may be energized in a predetermined cycle or sequence of operation by suitable control means shown in Figs. 3 and 4 and designated generally by the reference numeral 30.

As an example, such control means can include a drum 32 and constant speed driving means therefor, such as a constant speed motor 31 together with suitable reduction gearing. On the drum are mounted a series of cams designated generally by the reference numeral $b$, and specifically, as 14$b$, 15$b$, and 20$b$—25$b$. These cams are adapted to actuate the switch $a$ in the manner shown in Fig. 4.

The switch $a$ comprises upper and lower resilient elements 33 and 34, respectively, which are mounted in suitable insulating strips 35 as shown. The lower resilient element 34 is normally biased downwardly toward the drum 32 so that it is out of contact with the end of the upper resilient element 33. The cam $b$ serves to close the circuit between resilient elements 33 and 34 and through their associated signal light.

For purpose of illustration, it can be assumed that the control system is designed for an operating cycle of 120 seconds, the stop light and the go light being energized or illuminated for equal periods of 60 seconds each. Thus, the constant speed driving means 31 would be designed to rotate the drum once in 120 seconds. The cams 14$b$ and 15$b$ will therefore each be 180° long, and they will be offset from each other by 180°. Thus, in continuous operation, first the stop light will be energized for one minute, and then the go light will be energized the following minute, and the cycles will continuously succeed each other.

The cams 20$b$ to 25$b$ will flash the speed indicating lights 20 to 25 in a predetermined sequence which is illustrated in the graph of Fig. 6.

In this graph, the abscissa represents time in seconds, and the ordinate represents speed in miles per hour. In this particular illustration, the graph represents a period of 180 seconds, or one and one-half cycles, which is divided into two "go" periods, and one "stop" period. The go period represents the time during which the go light 15 is energized and the stop period represents the time during which the stop light 14 is energized. As pointed out above, the purpose of the speed indicating signal is to indicate to the driver of an automobile which is passing the signal at that time, a speed range which, if followed by the driver, will take him past the intersection, or signal 10 without interruption due to the stop light.

The curve 40 indicates the minimum speed in the sense that this speed must be exceeded by the vehicle operator if the car is to pass the intersection prior to the termination of the "go" period. The curve 41 indicates the maximum speed in the sense that this speed must not be exceeded if the car is not to arrive at the intersection prior to the termination of a stop period.

The curves 40, 41 are hyperbolas representing the quotient or ratio of the distance between the signals 10 and 11, to the time remaining before the termination of the go or stop periods, respectively.

The varying speed range heretofore referred to above is identified by the illumination of two of the speed indicating lights 20—25, these lights each having indicia thereon designating certain speeds, the upper light designating the maximum speed, and the lower light designating the minimum speed.

A minimum speed light flashing in correspondence with the minimum speed curve 40 is of utility to the car operator, when the signal ahead shows green, to enable him to determine whether to slow down his car so as to avoid coming to a sudden stop, or whether he can maintain his present speed and be assured that he will arrive at the intersection prior to the termination of the go period.

A maximum speed light flashing in correspondence with the maximum speed curve 41 is of utility when the signal ahead shows red, to enable the operator to determine the extent to which he should slow down his car to avoid a stop, or whether he can maintain his present speed and be assured that he will not arrive at the intersection prior to the termination of the stop period.

Thus two lights are always energized and they indicate the speed range which is calculated to permit the vehicle to travel without interruption, at the time that it arrives at the intersection.

With the aid of the two curves 40, 41, the sequential periods of operation of the indicator lights 20—25 can be laid out.

The reference numeral 42 designates a stepped curve which corresponds to the minimum speed curve 40 and the reference numeral 43 designates a stepped curve which corresponds to the maximum speed curve 41. The stepped curves are each formed of horizontal portions and of risers; the horizontal portions indicate and correspond to the length of the cams $b$, and they are so designated.

The dotted lines 45 and 44 of Fig. 6 indicate the cycle of operation of the speed indicating signal 11. It will be observed that this cycle is offset 15 seconds to the left of the stop-go cycle of signal 10 so that the minimum speed can be kept within reasonable limits.

Similarly, for reasons of public safety, the stepped curve 43 does not follow the maximum speed curve 41 upwardly, but it terminates in the horizontal portion 20$b$ which is designed to coincide with the statutory speed limit.

Slight deviations between the stepped curves and the hyperbolic curves may be introduced at the initial portion of the operating cycle for practical reasons, without diminishing the utility or effectiveness of the system.

A typical cross road installation is diagrammatically shown in Fig. 7 in which a north and south road 46 intersects an east and west road 47. At the intersection there may be provided one or more stop and go signals 10. The speed indicating signals 11 are located a predetermined distance, such as a quarter mile, on either side of the intersection along the road 47. Similar speed indicating signals 11' are located at similar distances from the intersection along road 46. These signals 11' are synchronized with the stop and go lights 16 and 17 and, in the case of the illustration given herein, are operated 180° out of phase with the lights 14 and 15 and 20—25. The control means for the cross road lights may include a second drum 32', mounted on the same shaft as drum 32, or a second set of switches may be provided for the drum 32 at a point which is offset 180° from the switches $a$.

In situations where a main highway is intersected by a secondary road the present practice is not to provide a continuous cyclical operation of the stop and go signal, but to provide a car actuated tripping mechanism to initiate its cycle of operation. In other words, the signals are normally set for "go" along the main highway; the approach of a car along a secondary road actuates the tripping mechanism which causes the stop and go signal to change.

In applying the present invention to such situations, the control means 30 may be designed to remain stationary at some intermediate position, such as the zero second position shown on the graph in Fig. 6, this also being the position of the drum shown in Fig. 3. In this position, the speed range will be 20–75 M. P. H. Then, when a car on the secondary road trips the mechanism, the speed indicating lights 20—25 begin their sequential operation, and at the 60 second point, the stop and go signal 10 changes from "go" to "stop" for the main highway and from "stop" to "go" for the secondary road. The control means 30 continues throughout its 120 second cycle, and will come to rest at the 120 second position.

This single cycle type of control is diagrammatically shown in Fig. 5, in which the motor 31 is controlled by two switches in parallel circuit with each other, one being a relay switch 50 and the other a cam operated switch 51. The relay switch 50 is momentarily closed by the tripping mechanism above referred to, not shown herein, and is maintained in closed circuit position by the relay coil 52. Thus, the drum 32 is set into rotation and the cycle initiated.

The drum carries a cam 53 which cooperates with the switch 51 to close the same shortly after the cycle has been initiated. It will be observed that the cam 53 is of a length somewhat less than 360°, the trailing edge being located at or just beyond the zero second point. Thus, the drum will come to rest, and its cycle of operation will be terminated, at this position. Suitable circuit breaking means, such as the bimetallic switch 54, may be interposed in the relay switch circuit so as to open the same prior to the completion of the drum cycle. Thus, the relay switch circuit serves to close the motor circuit until such time as the leading edge of cam 53 engages the cam 51 to close the cam-operated switch and circuit.

The tripping mechanism can be located at the intersection; or, where speed indicating signals 11' are provided on the secondary road, the tripping mechanism may be located adjacent the signals 11' to avoid waiting at the intersection.

The present invention is of particular utility where there is a turn in the road, or where the stop and go signal is otherwise not visible from a distance.

For moderate speeds, the spacing between the two signals may be changed, and suitable changes may be made in the timing cycle. The present invention is particularly well adapted for a city traffic control system having a stop and go signal at each block. In such situations, the speed indicating signal could be placed in the middle of the block or at the preceding intersection. Thus, the traffic can proceed continuously without interruption at a reasonable speed, such as twenty miles an hour, from block to block, and in bunched flow so that it will intermesh with the bunched flow cross traffic.

The usual amber light can be included in the stop and go signal 10; also, the number of speed indicating lights can be varied to accommodate different situations.

The term "hyperbolic speed curve" as used herein designates a curve, like curves 40 and 41 in which, assuming a constant distance, speed is plotted against a diminishing time interval.

The foregoing description is intended to be illustrative only; it will be understood that various modifications and changes may be made without departing from the spirit of my invention as pointed out in the appended claims.

I claim:

1. Means for controlling traffic along a highway or the like which comprises a first signaling device including stop and go signal lights, means for actuating the same to provide alternate stop periods and go periods, one of said periods being of predetermined length, a second signalling device spaced therefrom by a predetermined distance and including a series of signal lights, numerical indicia carried by said signal lights, each indicium representing a different speed in miles per hour and said indicia being displayed in order of increasing magnitude, and control means for actuating said second signaling device to cause the same to indicate, at any given instant, both a maximum and a minimum speed, the maximum speed being approximately equal to the ratio of said predetermined distance to the time interval between said given instant and the termination of a stop period, and said minimum speed being approximately equal to the ratio of said distance to the time interval between said given instant and termination to a go period, said control means including a first set of cams for operating all of said lights, except the highest, in non-overlapping sequential periods, and including a second set of cams for operating all of said lights, except the lowest, in non-overlapping sequential periods, the cycle of operation of said first set of cams overlapping the cycle of operation of said second set of cams so as to cause said second signaling device to indicate both a minimum and a maximum speed.

2. A traffic control system comprising two signaling devices spaced from each other by a predetermined distance one signaling device having a stop light and a go light, and the other signaling device having a plurality of speed indicating lights representing a sequential series of speeds, means for alternately actuating said stop and go lights, and means for sequentially flashing said speed indicating lights for non-overlapping periods prior to a particular actuation of said go light so that the product of the speed indicated by the flashed light and the time interval remaining prior to said go light actuation is approximately equal to said predetermined distance, and means for sequentially flashing said speed indicating lights for non-overlapping periods prior to a particular actuation of said stop light so that the product of the speed indicated by the flash light and the time interval remaining prior to said stop light actuation is approximately equal to said predetermined distance, said two last-named flashing means operating simultaneously so that two of said indicating lights will be flashed at the same time.

3. A traffic control system comprising two signaling devices spaced from each other by a predetermined distance, one signaling device having a stop light and a go light, and the other signaling device having a plurality of speed indicating lights representing a sequential series of speeds, means for alternately actuating said stop and go lights, first cam controlled means for energizing one of said speed indicating lights to indicate a minimum speed during the sequential operation thereof prior to a change of said first signaling device from stop to go, and second cam controlled means for energizing another one of said lights during the sequential operation thereof prior to the change of said first-mentioned signaling device from go to stop to indicate a maximum speed, said first and second cam controlled means each being operative for actuating said speed indicating lights sequentially and for non-overlapping periods, all of said speed indicating lights except the highest being actuated by said first cam controlled means, and all of said speed indicating lights except the lowest being actuated by said second cam controlled means whereby two of the lights of said second signaling device are energized to indicate a speed range which is calculated to permit a vehicle passing said second signaling device to travel without interruption past said first signaling device.

4. A traffic control signal for installation alongside a highway at a substantial distance from a stop and go signal comprising a housing, means for mounting said housing alongside a highway, a series of lights disposed in said housing and arranged in alignment with each other, numerical indicia carried by said lights, each indicium rerseting a different speed in miles per hour, and said indicia being displayed in order of increasing magnitude, and cyclically operating means for causing said lights to be illuminated and extinguished one after the other in order of increasing magnitude to indicate two progressively increasing rates of speed, said cyclically operating means including two separate actuating devices, each being operative for actuating said lights sequentially and for non-overlapping periods, all of the lights except the highest being actuated by one of said actuating means, and all of said lights except the lowest being operated by the other of said actuating means, whereby two lights of said series will be illuminated to indicate both a minimum speed and a maximum speed.

5. A traffic control signal comprising a housing, a series of lights disposed in said housing and arranged in alignment with each other, numerical indicia carried by said lights, each indicium representing a different speed in miles per hour, and said indicia being displayed in order of increasing magnitude, a separate control circuit for each light including a switch, and control means comprising a common cam carrying member, and a series of cams on said cam carrying member, one for each switch, for closing said switches, said cams being of a progressively shorter and non-overlapping length to operate each of said lights for non-overlapping sequential periods, the length of each cam varying in accordance with the horizontal portions of a stepped curve which approximates a hyperbolic speed curve.

6. A traffic control signaling device comprising a housing, a plurality of signal lights disposed in said housing and adapted to be operated in two sequences of operation to indicate both a minimum speed and a maximum speed, said two sequences of operation being coextensive in length and comprising a cycle of operation, numerical indicia associated with said signal lights, each indicium representing a different speed in miles per hour, and said indicia being displayed in order of increasing magnitude, a separate control circuit for each signal light including a switch, and control means comprising two series of cams for closing said switches, one series of cams providing a cam for each switch except that associated with the signal light indicating the highest speed, and the other series of cams providing a cam for each switch except that associated with the signal light indicating the lowest speed, the cams of each series being of a progressively shorter length with respect to the order in which said indicia are arranged, and being of non-overlapping length, and common means for driving both of said series of cams, whereby said signal lights will be operated for non-overlapping sequential periods in two sequences of operation, the length of each cam of a given series varying in accordance with the horizontal portions of a stepped curve which approximates a hyperbolic speed curve.

References Cited in the file of this patent

UNITED STATES PATENTS

| | | |
|---|---|---|
| 1,042,316 | Cantrall | Oct. 22, 1912 |
| 1,866,899 | Winier | July 12, 1932 |
| 2,082,479 | Buerke | June 1, 1937 |
| 2,241,998 | Iwasaki et al. | May 13, 1941 |
| 2,288,458 | Jeffers | June 30, 1942 |
| 2,407,432 | Manewich | Sept. 10, 1946 |
| 2,604,525 | Zannettos | July 22, 1952 |
| 2,683,868 | McKnight | July 13, 1954 |

FOREIGN PATENTS

| | | |
|---|---|---|
| 20,219 | Australia | of 1929 |
| 592,363 | Great Britain | Sept. 16, 1947 |